United States Patent [19]
Ueda et al.

[11] Patent Number: 5,597,244
[45] Date of Patent: Jan. 28, 1997

[54] ELECTRONIC TYPEWRITER WITH SPELL VERIFY

[75] Inventors: Hiroyuki Ueda, Irvine; John M. Curren, Huntington Beach, both of Calif.

[73] Assignee: Canon Business Machines, Inc., Costa Mesa, Calif.

[21] Appl. No.: 444,014

[22] Filed: May 18, 1995

Related U.S. Application Data

[63] Continuation of Ser. No. 921,644, Jul. 30, 1992, abandoned.

[51] Int. Cl.⁶ ........................................................ B41J 5/30
[52] U.S. Cl. ................................................ 400/63; 395/800
[58] Field of Search ............................... 395/325, 800; 400/63, 74; 364/419.12

[56] References Cited

U.S. PATENT DOCUMENTS

| | | | |
|---|---|---|---|
| 4,633,392 | 12/1986 | Vincent | 395/325 |
| 4,775,251 | 10/1988 | Suzuki et al. | 400/63 |
| 4,783,761 | 11/1988 | Gray et al. | 364/900 |
| 4,837,712 | 6/1989 | Shibamiya | 400/70 |
| 5,068,824 | 11/1991 | Koeutzburg et al. | 400/63 |

FOREIGN PATENT DOCUMENTS

| | | | |
|---|---|---|---|
| 0458629 | 11/1991 | European Pat. Off. | 400/63 |
| 265357 | 11/1988 | Japan | 400/63 |
| 2227588 | 8/1990 | United Kingdom | 400/63 |

OTHER PUBLICATIONS

Microprocessors and Programmed Logic pp. 16–18.
"MCU Series Delivers 16-Bit Punch In An 8-Bit Package", by J. Child, Computer Design, vol. 31, No. 2, Feb. 1992, pp. 122–123.
"UC Combines 4-Bit Peripherals With 8-Bit CPU", by R. Weiss, EDN — Electrical Design News, vol. 37, No. 10, May 7, 1992, pp. 122–124.
"Multi-Language Dictionaries For Text Processing", IBM Technical Disclosure Bulletin, vol. 28, No. 10, Mar. 1986, pp. 4310–4311.
"M38002M4–XXXSP/FP: Single-Chip Eight-Bit CMOS Microcomputer", 1990 Mitsubishi Single-Chip 8-Bit Microcomputers, pp. 2–731 to 2–760.

*Primary Examiner*—Edgar S. Burr
*Assistant Examiner*—Steven S. Kelley
*Attorney, Agent, or Firm*—Fitzpatrick, Cella, Harper & Scinto

[57] ABSTRACT

A spell verification method and apparatus which comprises inputting characters and operational modes by keystrokes, printing input characters, providing a read only memory having plural dictionaries with spelling information, each dictionary including different but complementary dictionary entries, and executing program steps by a single chip microprocessor which includes an internal memory for storing program steps to control functions of the printer via a dedicated interface port and to control a spell verification function of the electronic typewriter. The single chip microprocessor further includes a detector for detecting whether the read only memory is connected to a dedicated interface port of the single chip microprocessor. Upon determining the status of the connection, the single chip microprocessor either enables or disables the spell verification function.

131 Claims, 6 Drawing Sheets

ELECTRONIC TYPEWRITER WITH SPELL VERIFY

This application is a continuation of application Ser. No. 07/921,644 filed Jul. 30, 1992, now abandoned.

BACKGROUND

1. Field of the Invention

The present invention relates to a spell verification electronic typewriter which utilizes a spelling dictionary to verify whether a word is spelled correctly.

2. Description of the Related Art

Conventional electronic typewriters with spell verification include a first microprocessor to control typewriter functions such as keyboard input and printer output, and a second microprocessor to control the spell verification function. Thus, as shown in U.S. Pat. No. 4,689,768, a printer processor accepts keyboard input and causes a printing element to print characters that correspond to the input. In response to a request to verify spelling, a spelling verification processor, which is independent of the printer processor and includes its own program and data storage memory, is actuated to determine if the keyed-in word is correctly spelled.

It has been considered to combine typewriter functions and spell verification functions into one processor. However, because of the nature and complexity of those functions, it has heretofore been necessary to provide the processor with computer-like structure such as external memories and address and data buses. For example, to control the keyboard and the printer and at the same time provide for access to a spelling dictionary, the processor must ordinarily include an address bus and a data bus to send and receive information to and from the printer and the keyboard, to send and receive information from the spelling dictionary, and to send and receive processor instructions and print data from external program memory and data memory. Moreover, simply to coordinate this computer-like structure and ensure its functionality, the processor must execute extra functions, instructions that are unrelated to electronic typewriter or spell verification functions, such as bus contention functions, device-busy checking, read/write coordination, etc.

Such computer-like structure increases the cost and complexity of the electronic typewriter, as well as requiring high development costs. These costs recur for each different model of electronic typewriter.

SUMMARY OF THE INVENTION

It is object of the invention to address these difficulties.

In one aspect the invention is an electronic typewriter and a typewriting method in which typewriter functions and spell verification functions are performed by a single chip microprocessor whose program is stored in an on-chip program memory. Thus, there is no need to provide computer-like structure such as an address bus, a data bus, program memory, etc.; nor is there a need to provide the processor with the extra functionality that would be needed to control that computer-like structure.

According to this aspect of the invention, a printing apparatus comprises input means for manually inputting print information, output means for outputting print information, storage means for storing at least one spelling information dictionary, and processing means, including a single chip microprocessor having internal program storage means for storing process steps that control the output means to output print information based on print information input by the input means and that access the storage means in accordance with print information input by the input means. The storage means as well as the input and output means may be accessed by dedicated interface ports of the microprocessor.

The input means may include a keyboard for manually inputting characters, and the output means may include a printer having a daisy wheel motor, a hammer, a carriage motor, and a ribbon motor. The single chip microprocessor preferably includes an interface port to the keyboard, another interface port to the printer, and another interface port for accessing the dictionary.

The processor for the electronic typewriter may be configured so as to enable it to be used both with and without the spelling dictionary and to be operable without error in either configuration without the need for reprogramming. In this manner, an electronic typewriter with such a processor can be used without modification for both a low-end typewriter without spell verify and a higher-end typewriter featuring spell verify. Advantageously, such an arrangement reduces development costs since the same processor is used regardless of whether a spelling dictionary is included with the typewriter.

According to this aspect of the invention, a spell verification processor comprises a microprocessor having a dedicated interface connectable to a dictionary containing spelling information. The microprocessor has a selectably actuatable spell verification mode in which a character string is checked against the spelling information within the dictionary. The microprocessor includes means for checking whether the dictionary is connected to the interface of the microprocessor and wherein the microprocessor is adapted to actuate the spell verification mode in the case the dictionary is connected and to disable the spell verification mode in the case the dictionary is not connected.

It is also possible to provide an electronic typewriter with more than one dictionary, for example, an American-english dictionary and a British-english dictionary, one of which is switchably actuated. Such a configuration allows a single electronic typewriter to serve different markets. For example, a British operator can use the same electronic typewriter as an American operator merely by selecting the appropriate dictionary. In this manner, the word "colour", which is correctly spelled in Great Britain but incorrectly spelled in the U.S., will only be flagged as misspelled if the American-english dictionary is selected.

According to this aspect of the invention, a printing apparatus comprises storage means including a single read only memory having plural dictionaries of spelling information, designation means for designating one of the plural dictionaries, and process means for selecting the dictionary in accordance with the designation by the designation means.

Objectives and advantages in addition to those discussed above shall be apparent to those skilled in the art from the description of the preferred embodiment of the invention which follows. In the description, reference is made to the accompanying drawings, which form a part hereof, and which illustrate an example of the invention. Such example, however, is not exhaustive of the various embodiments of the invention, and therefore reference is made to the appended claims for determining the scope of the invention.

DETAILED DESCRIPTION OF THE PREFERRED EMBODIMENT

Figure 1:
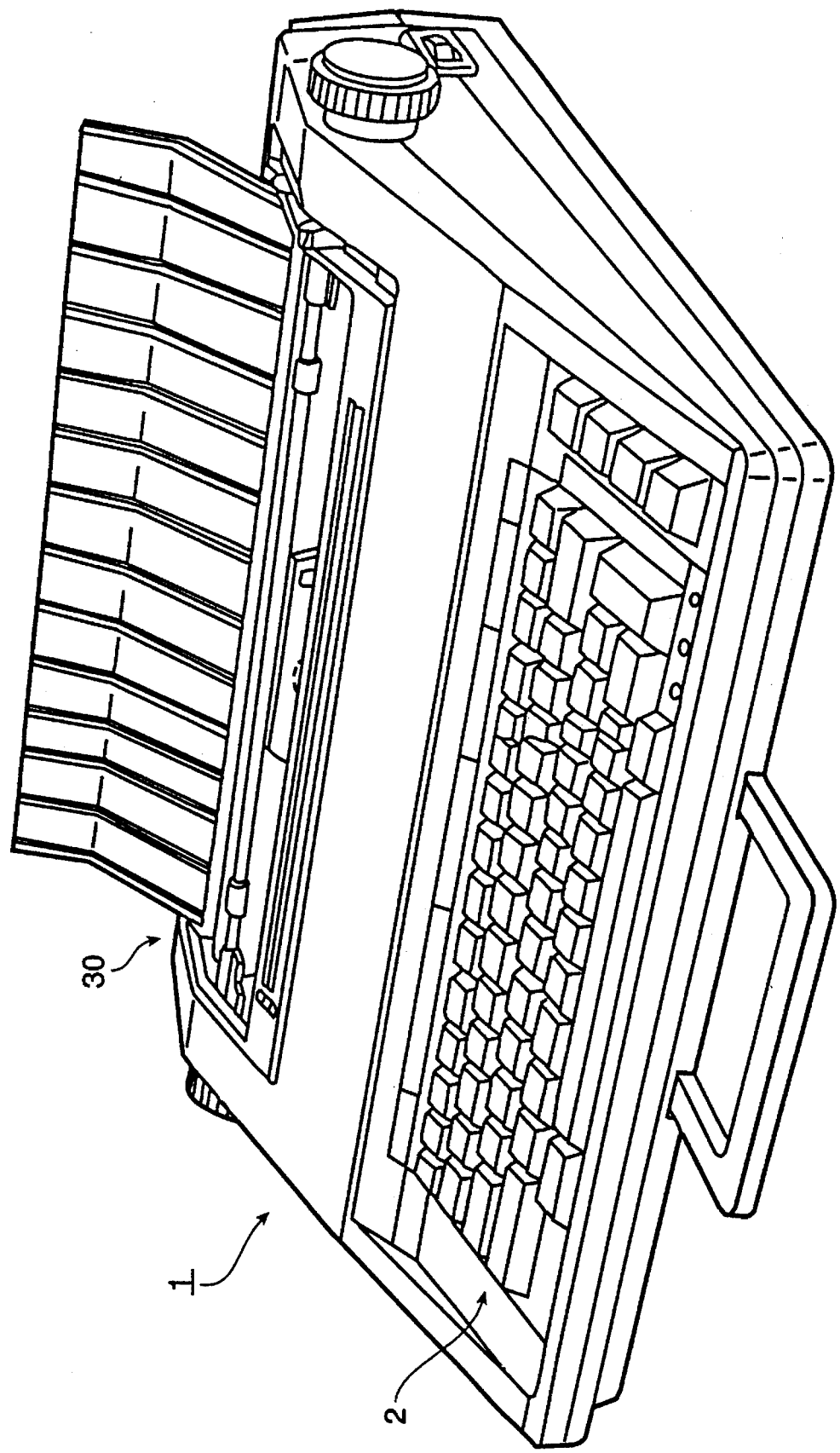
FIG. 1 is a perspective view of an electronic typewriter according to the invention.
Figure 2:
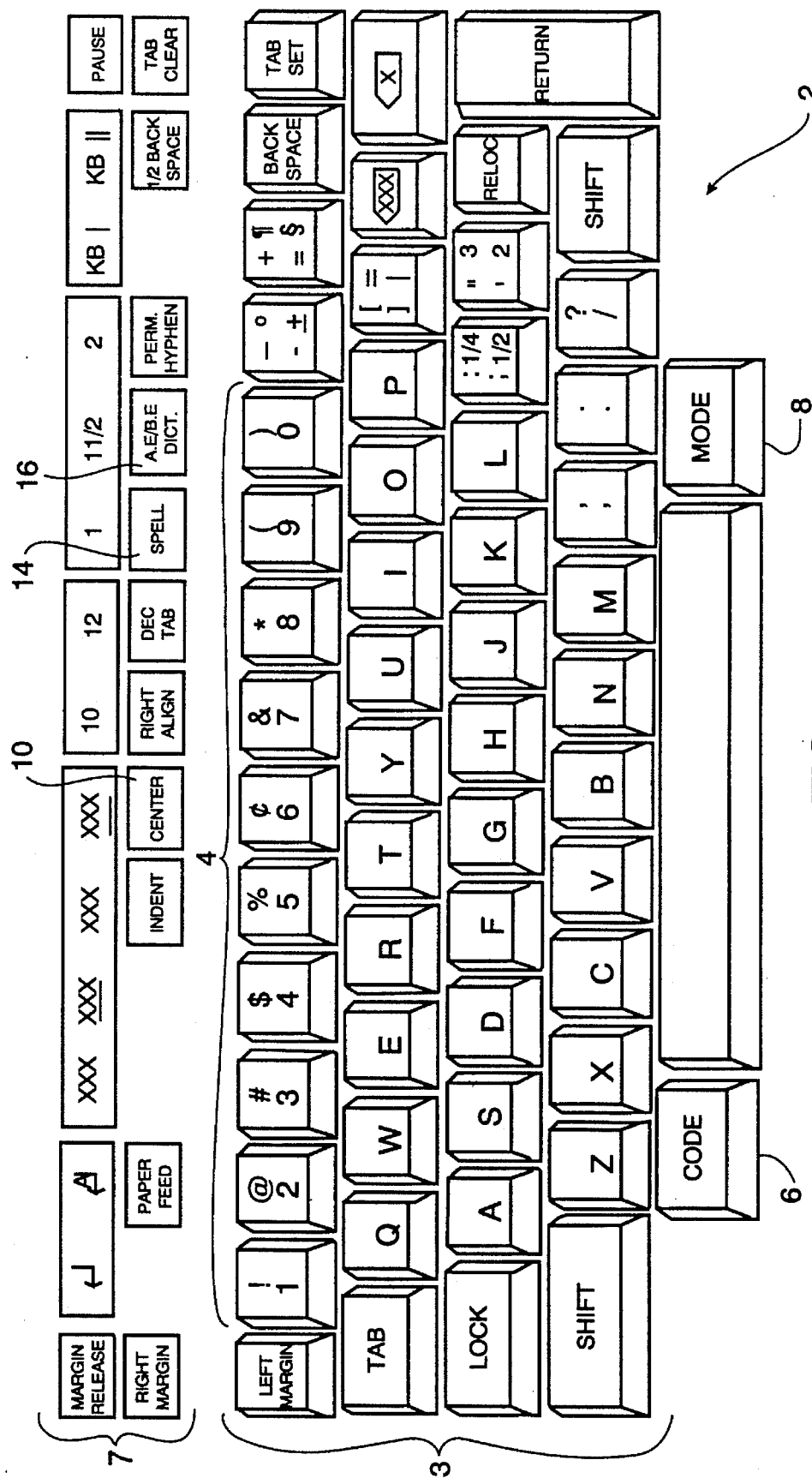
FIG. 2 is a plan view of the keyboard of the electronic typewriter shown in FIG. 1.

A perspective view of the electronic typewriter 1 of the present invention is shown in FIG. 1 and includes input means such as keyboard 2 and output means such as printer 30. A detailed diagram of the keyboard 2 of the present invention is shown at FIG. 2. The keyboard 2 includes a alphanumeric keyboard section 3, and a guide template section 7. The keyboard section 3 is a typical alphanumeric keyboard in which a plurality of alphanumeric keys 4 are used to input print information such as alphanumeric characters. The alphanumeric keyboard section includes control keys which include CODE key 6 and MODE key 8. The control keys are used to actuate certain modes or functions performed by the typewriter such as those modes or functions which are indicated on the guide template section 7. For example, when pressing the key sequence of "CODE" followed by "6" (hereafter "CODE+6"), the center function is actuated as indicated on the guide template at 10. In another example, by pressing key sequence MODE+7, character pitch on the typewriter is set to 10 cpi and by pressing MODE+8 the pitch is set to 12 cpi.

In addition to the foregoing features of the typewriter, there are two typewriter functions which are available when the typewriter is installed with stored dictionaries. These features include a spell verification function which is actuated by pressing the key sequence "CODE" followed by 9 (hereinafter "CODE+9") and indicated on the guide template at 14. A dictionary selection function, which is indicated on the guide template at 16, is used to select between an American-english dictionary and a British-english dictionary by pressing "CODE" followed by "0" (hereinafter "CODE+0"). The current selection is indicated by an audible tone.

If the spell verification function is actuated and currently using the British-english dictionary, pressing CODE+0 will cause the dictionary selection function to change dictionaries from the current British-english dictionary to the American-english dictionary instead. Pressing the key sequence CODE+0 again will cause the dictionary selection function to change back to the British-english dictionary.

Figure 3:
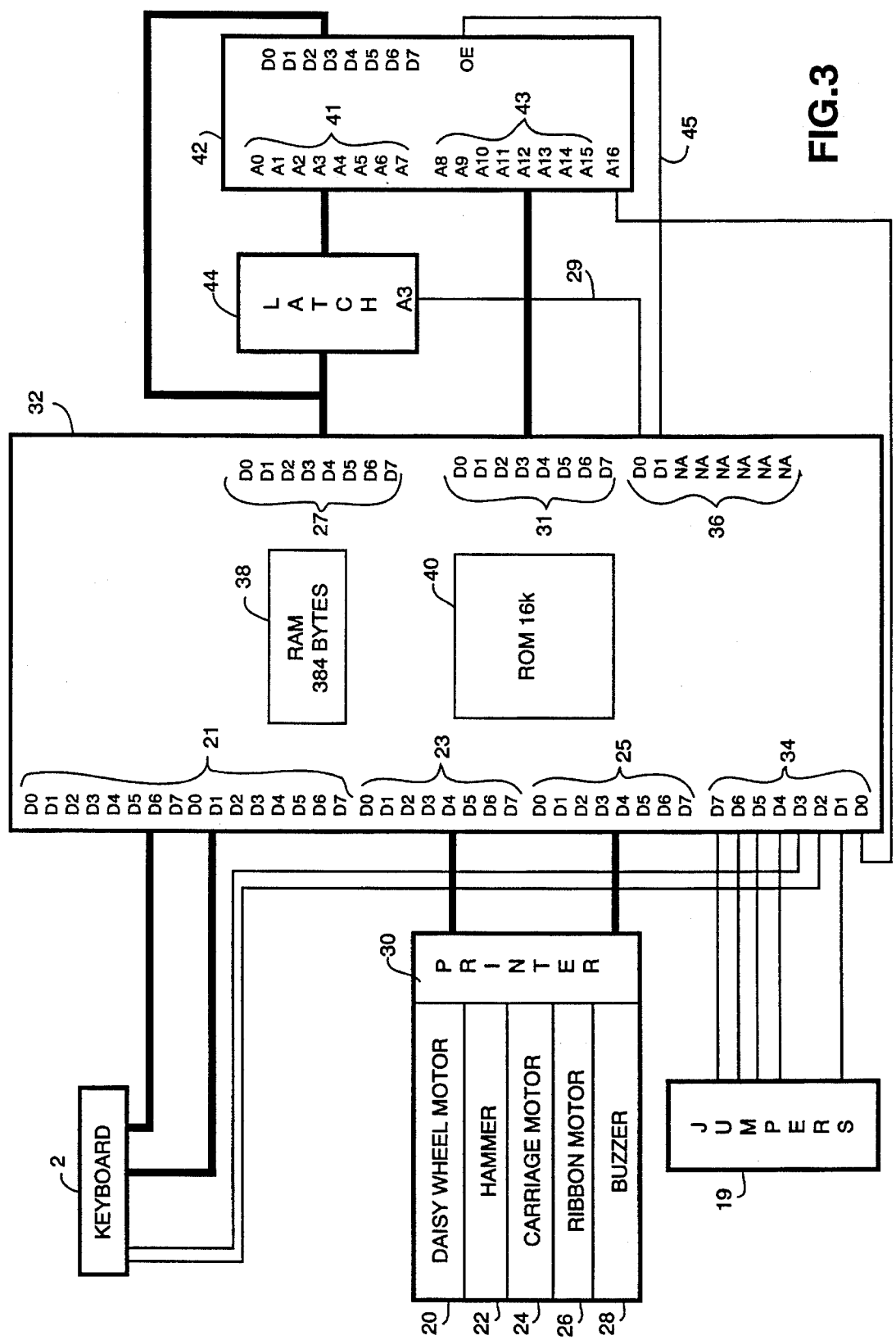
FIG. 3 is a schematic drawing of the electronic typewriter shown in FIG. 1.

FIG. 3 is a schematic diagram of the components of the electronic typewriter 1. The electronic typewriter includes microprocessor 32 having plural interface ports for accessing external peripheral devices such as keyboard 2, printer 30 and dictionary ROM 42. The microprocessor includes an internal read only memory (ROM) 40 which stores control information such as process steps for controlling typewriter functions such as keyboard and printer operations as well as for controlling spell verify functions. The microprocessor 32 also includes an internal random access memory (RAM) 38 for providing a temporary word buffer which contains input print information, such as character strings input by keyboard 2, and three flag indicators which indicate respectively if the external dictionary ROM is present, whether the spell verification function is enabled or disabled, and the current dictionary selection.

Jumpers 19 are provided so as to permit microprocessor 32 to operate with keyboards whose configurations are different from that shown in FIG. 2. Specifically, the physical configuration of the keyboard may differ depending on the country in which the electronic typewriter is intended to be delivered. For example, a keyboard for Germany may have the "y" and "z" keys interchanged. In order to facilitate the manufacturing of the various keyboards without changing the programming in microprocessor 32, microprocessor 32 inspects the jumper configuration and operates accordingly.

Printer 30 may be a conventional printer comprised by daisy wheel motor 20, hammer 22, carriage motor 24, and ribbon motor 26. Microprocessor 32 controls the movement of daisy wheel motor 24, hammer 22, and carriage motor 24 in accordance with input print information and in accordance with the program stored in ROM 40. Other output means may be used, for example, ink jet printers, bubble jet printers, and thermal transfer printers.

In the illustrated embodiment, a single chip microprocessor is preferably used, such as a Mitsubishi M38002M4, which features 384 bytes of internal random access memory (RAM), 16 kilobytes of internal ROM and eight interface I/O ports for sending/receiving control information to the keyboard and the printer, and for sending/receiving address information and data to/from the external dictionary ROM. The microprocessor 32 contains sufficient internal storage in RAM 38 and ROM 40 to store input character strings and words, control software for controlling the electronic typewriter, and process steps for the spell verification functions.

Dictionary ROM 42 is a singe ROM chip in which is stored two complete dictionary databases of spelling information, one for American-english words and the other for British-english words. Both dictionary databases are approximately the same size, same format, and contain different but complementary entries. For example, an entry for the word "color" in the American-english dictionary will have a different but complementary word "colour" stored in the British-english dictionary. Likewise, whereas the American-english dictionary may have an entry for the word "gasoline", the British-english dictionary may have an entry for the word "petrol". Not all words are necessarily included in each dictionary; for example, an entry for the word "varsity" appears in the American-english dictionary but there is no corresponding word in the British-english dictionary. Any language dictionary may be substituted for both or either dictionary, and any number of dictionaries may be included.

Preferably, however, both dictionaries include at least one identical entry, such as the word "the", so as to facilitate checking whether the dictionary ROM is connected, as described more fully below. A suitable dictionary for use in ROM 42 is the spelling verifier database available from Houghton-Mifflin.

Both dictionaries can be stored on the same physical ROM, such as a one megabit Toshiba TC571000D. In the present embodiment, each such dictionary requires approximately 512 kilobits of storage within the ROM. One half the ROM is dedicated to the American-english dictionary and the other half is dedicated to the British-english dictionary. With such an arrangement, 16 bits are required to address one word in both dictionaries (bits A0 through A15). A seventeenth address bit, A16 which is the most significant bit, is used to select which dictionary is accessed and, consequentially, which dictionary returns data to the microprocessor. For example, if the 17th bit is set to "0", then the American-english dictionary is selected. On the other hand, if the 17th bit is set to "1" then the British-english dictionary is selected. The most significant bit is controlled by port 34 of microprocessor 32 and is selected by the key sequence CODE+0.

Microprocessor 32 includes dedicated interface port 21 for communicating with keyboard 2, and includes dedicated interface ports 23 and 25 for communicating with printer 30 and buzzer 28. Input print information from keyboard 2 as well as control operations are sent to microprocessor 32 through interface port 21. In accordance with the input print information and control operations, microprocessor 32 sends commands to printer 30 through interface ports 23 and 25 to print input characters. Microprocessor 32 also sends signals through ports 23 and 25 to buzzer 28 in response to retrieved data from ROM 42 or in accordance with an operational function, such as end of line.

Microprocessor 32 addresses dictionary ROM 42 through interface ports 27 and 31, with the most significant bit controlled by port 34, as described above. The interface ports are dedicated ports in that no other devices are connected to those ports and the ports are configured to communicate only with ROM 42.

Port 27 of microprocessor 32 is also connected to the data lines of external dictionary ROM 42 so as to allow microprocessor 32 to access spelling information from external ROM 32.

Microprocessor 32 in the illustrated embodiment is configured such that it can output information to only one of its eight interface ports at any one time. Accordingly, address latch 44 is provided to latch the eight least significant bits (A0 through A7) of the 17 bit address. Address latch 44 is connected to port 27 of microprocessor 32 and controlled by enable 29 of port 36. Address latch 44 temporarily stores the least 8 bits of the ROM address. When enable 29 is high, 8 bits sent from port 27 are latched into address latch 44. When enable 29 is low, the 8 bits from address latch 44 and 8 bits from port 27 (total of 16 bits) go to ROM address lines 41 and 43, respectively. The seventeenth bit (i.e., the dictionary selection bit) is provided from port 34. Once the address is sent to external ROM 42, output enable 45 is set so as to enable the spelling information data at the specified address to be read by the microprocessor 32 at port 27.

Figure 4:
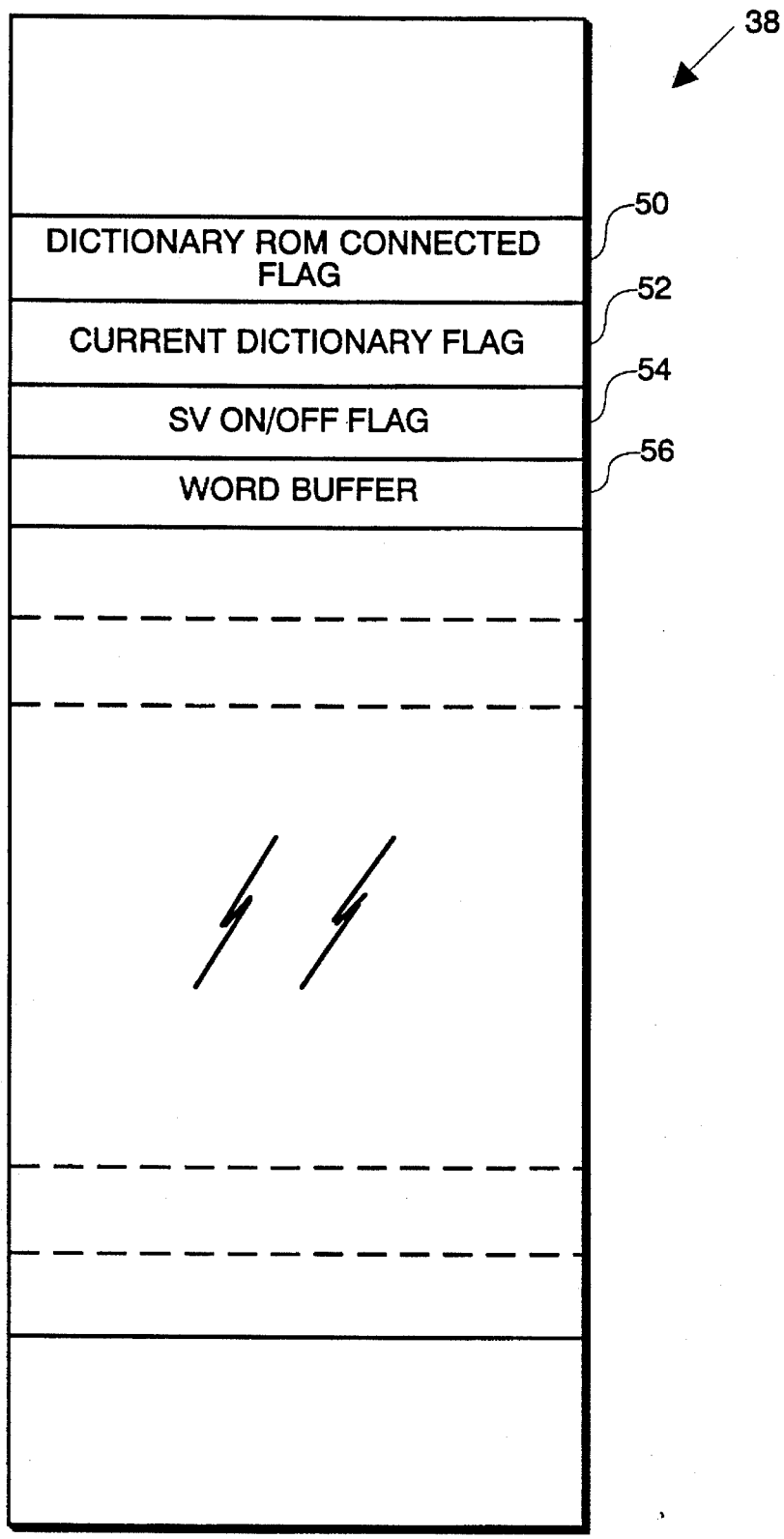
FIG. 4 is a memory map of the RAM within the microprocessor shown in FIG. 3.

FIG. 4 is a representation of a memory map of the internal RAM 38 of microprocessor 32. RAM 38 is used to store information regarding the current status of the operation functions of the electronic typewriter 2 such as print information. RAM 38 also stores flags that indicate whether the spell verification function has been enabled or disabled.

In FIG. 4, there are three flag indicators that effect the behavior of the spell verifier function. Dictionary ROM-connected flag 50 indicates whether the electronic typewriter includes a dictionary ROM. In this manner, an electronic typewriter can be sold having the spell verifier function or the electronic typewriter can be sold without the spell verifier function. Current dictionary flag 52 indicates the current dictionary selected in accordance with CODE+0 selection by the operator. Spell verifier on/off flag 54 indicates whether the spell verifier is enabled or disabled in accordance with CODE+9 selection by the operator. By virtue of the stored flags, the microprocessor 32 can readily determine the status of the spell verification function.

When the current dictionary flag 52 is clear (setting the flag to "0"), the American-english dictionary is selected, and when the current dictionary flag 52 is set (setting the flag to "1"), the British-english dictionary is selected. When the spell verifier on/off flag 54 is clear, the spell verifier is off and when the spell verifier on/off flag 54 is set, the spell verifier is on. The remaining portion illustrated in RAM 38 is dedicated as a word buffer 56. The word buffer 56 contains a word input and/or character strings input by the operator represented by print information in common ASCII codes. In operation, the program software detects an end of word or end of character string has been entered by the operator. End of word or character string is detected, for example, when an operator enters either a space character or a punctuation character or the "return" key.

At power-up, microprocessor 32 performs a systems check which includes detecting whether external dictionary ROM 42 is connected to ports 29 and 31 of microprocessor 32. In accordance with this detection, dictionary ROM-connected flag 50 is set or cleared.

Figure 5:
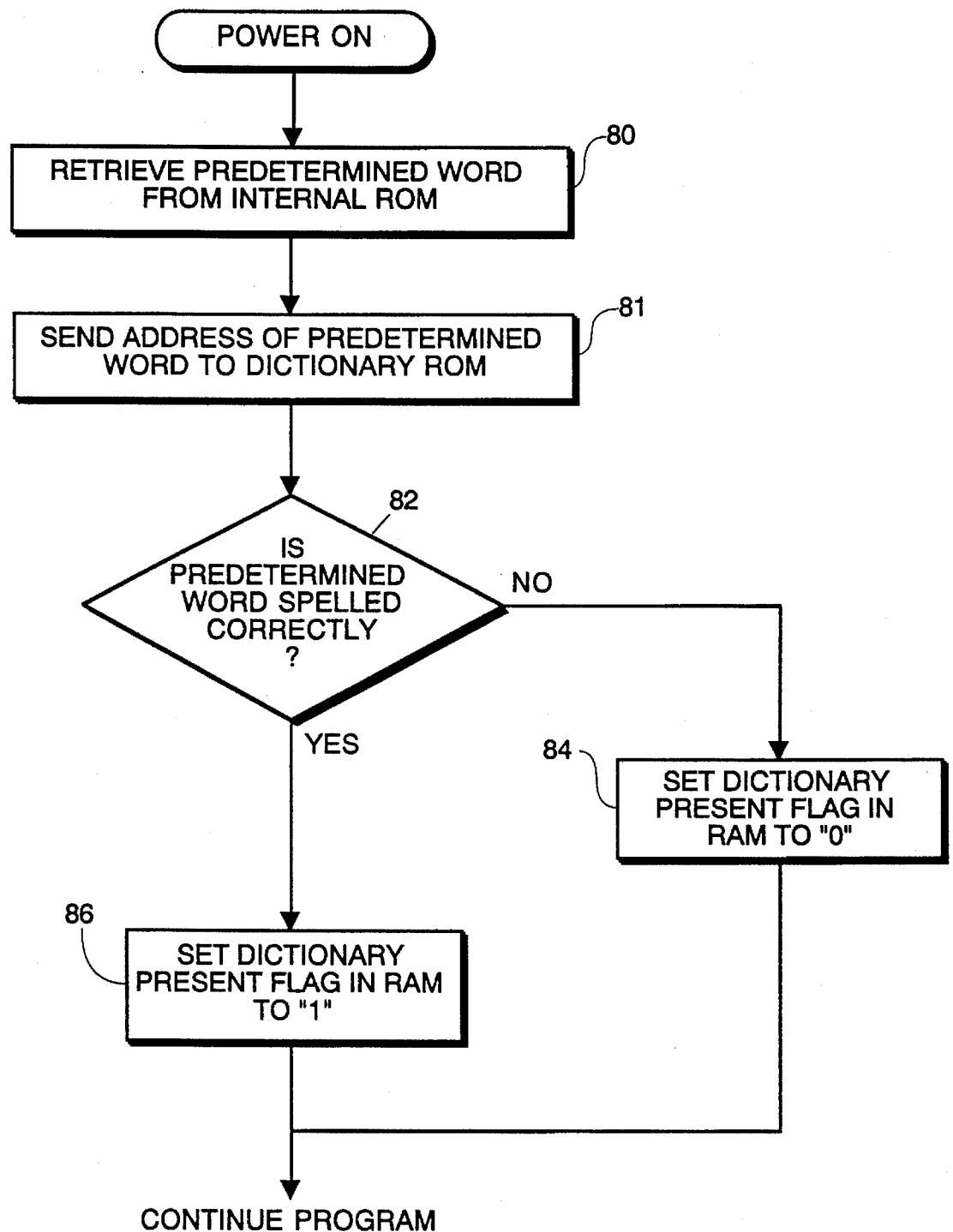
FIG. 5 is a flow chart of power-up processing performed by the electronic typewriter shown in FIG. 1.

FIG. 5 is a flow chart showing the power-up systems check steps. In step 80, microprocessor 32 retrieves from internal ROM 40 a predetermined word that is spelled identically in both dictionaries. For example, the word "color" could not be used as a predetermined word since "color" is spelled differently in the British-english dictionary. On the other hand, the word "the" is spelled identically in both dictionaries and if sent to either dictionary, regardless of which is selected, will be verified as correctly spelled.

In step 81, the address of the predetermined word is sent to both dictionaries in dictionary ROM 42. In this step, the status of the seventeenth address bit A16, and consequently which of the two dictionaries is accessed, is immaterial because the predetermined word is spelled identically in both dictionaries.

Step 82 checks if the ROM indicates that the predetermined word was spelled correctly. Since the predetermined word was selected so that it is correctly spelled in either dictionary, the only reason that the ROM would indicate an incorrect spelling is that the ROM is not connected. Accordingly, if step 82 determines that the word is spelled incorrectly, then flow advances to step 84 where the dictionary ROM-connected flag 50 is set to "0" in RAM 38. Thereafter, the program exits indicating that a dictionary ROM is not connected to interface ports 29 and 31 of microprocessor 32. That is, the electronic typewriter has been shipped without a spell verification function. On the other hand, if step 82 determines that the word was spelled correctly, then flow advances to step 86 where the dictionary ROM-connected flag 50 is set to "1" in RAM 38, indicating that dictionary ROM 42 is connected.

Figure 6:
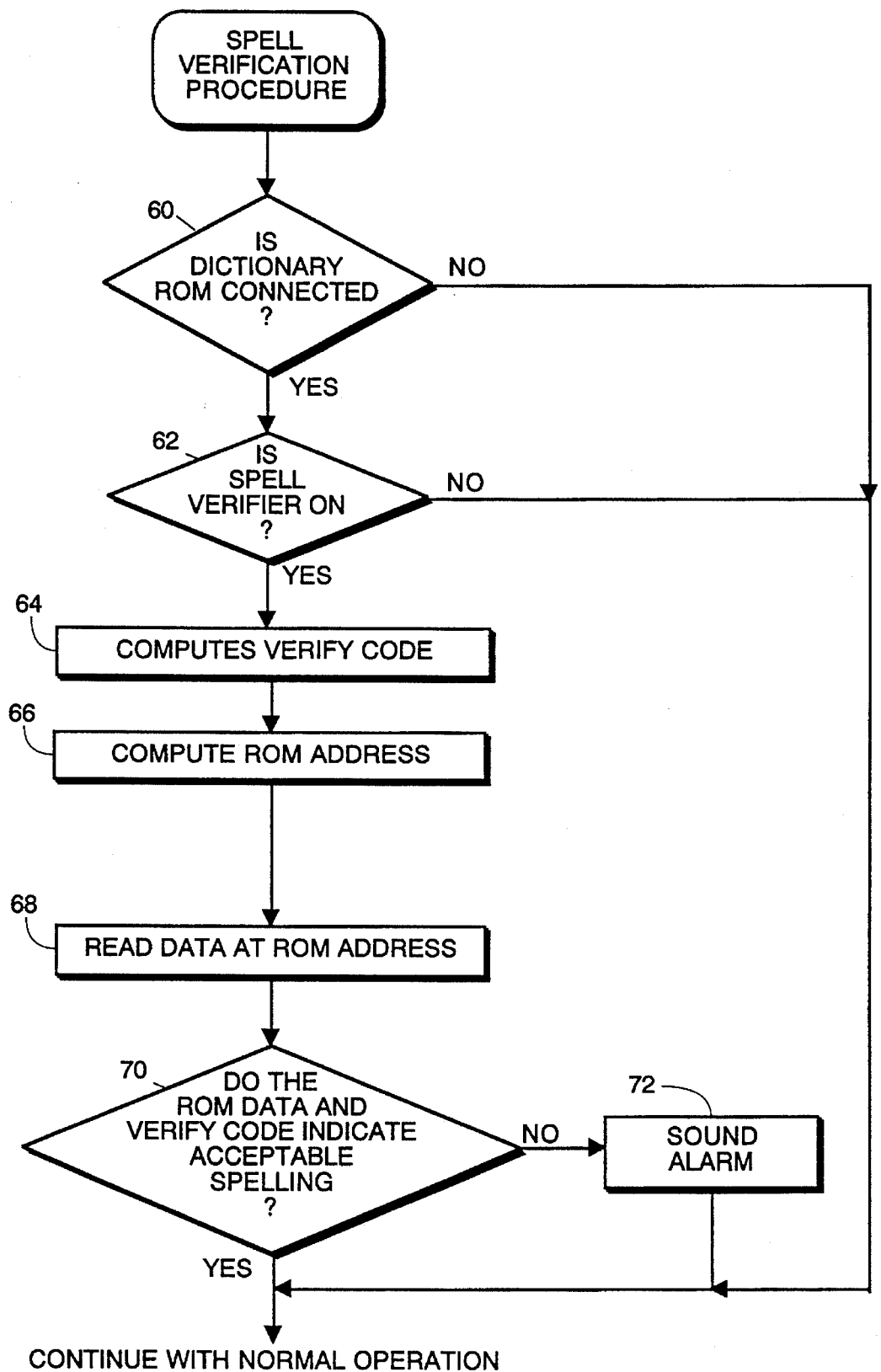
FIG. 6 is a flow chart of the spell verification function.

FIG. 6 is a flow chart of the spell verification function process. Upon power-up, the spell verification process checks the status of the dictionary ROM-connected flag 50 stored in RAM 38, as set by the flow process of FIG. 5, to determine if the dictionary ROM is connected in the electronic typewriter (step 60). In the case the dictionary ROM is not connected, the spell verification process immediately exits the spell verification program. In the case the dictionary ROM is connected, the spell verification procedure proceeds to step 62 to determine whether the spell verifier on/off flag 52 is set in RAM 38 thereby indicating if the spell verification is enabled or disabled in accordance with the operator selecting CODE+9.

In the case the spell verifier is enabled, the spell verification procedure computes a verify code in step 64 based on the current contents of word buffer 56 stored at RAM 38. The algorithm for computing the verify code and the format of the information in the dictionary database is known in the art; suitable algorithms are available from Houghton-Mifflin in connection with the above-described dictionary database. In step 66, the spell verification procedure computes the ROM address for dictionary ROM 42.

In step 68, the data at that ROM address is retrieved and compared with the print information stored in RAM 38. The data retrieved from the selected portion of the dictionary ROM is then compared with the verify code computed in step 64 to determine if the spelling is acceptable as shown in step 70. In the case the spelling is correct, normal typing operation continues. However, in step 72, in the case the spelling of the word is unacceptable, an audible alarm is sounded by buzzer 28. Preferably, the audible alarm is distinctive so that an operator can readily distinguish between an alarm indicating improper spelling from other alarms such as alarms associated with typewriter functions (margin, etc.) and alarms associated with other typewriter errors.

What is claimed is:

1. A printing apparatus comprising:

input means for manually inputting print information;

output means for outputting print information;

storage means for storing at least one spelling information dictionary; and processing means including a first dedicated interface comprised of a first multi-bit connection to said output means for interfacing to said output means, a second dedicated interface comprised of a second multi-bit connection to said storage means for delivering address information to said storage means, and a third dedicated interface comprised of a third multi-bit connection and which is connected to an address latching means for latching address information from the third dedicated interface to the storage means simultaneously with the delivery of address information from the second dedicated interface to the storage means and which is also connected to the storage means for receiving spelling information accessed from the storage means, said processing means including a single chip microprocessor having internal program storage means for storing process steps that control said output means to output print information based on print information input by said input means and that access said storage means in accordance with print information input by said input means, wherein said processing means writes 1) a first part of address information through the second dedicated interface to the storage means and 2) a second part of address information through the third dedicated interface to the storage means, and wherein the storage means outputs spelling information to the third dedicated interface based on the first and second parts of address information.

2. A printing apparatus according to claim 1, wherein said single chip microprocessor further comprises memory means including random access memory for storing print information input by the input means, and wherein said process steps access said storage means based on the print information in the memory means.

3. A printing apparatus according to claim 2, wherein said print information includes character string, and wherein said processing means includes detection means for detecting end of character string.

4. A printing apparatus according to claim 3, wherein said processing means is adapted to access said storage means and wherein said processing means is adapted to access said storage means in response to end of character string detection.

5. A printing apparatus according to claim 4, wherein said processing means retrieves spelling information stored based on said access, and further comprising alarm means responsive to retrieved spelling information.

6. A printing apparatus according to claim 5, wherein the processing means senses plural operational conditions and sounds the alarm distinctively for different operational conditions.

7. A printing apparatus according to claim 3, wherein said detection means detects end of character string in response to an input of a space or a punctuation by said input means.

8. A printing apparatus according to claim 1, wherein said input means is comprised by a keyboard.

9. A printing apparatus according to claim 8, wherein said keyboard includes control keys for controlling operational modes.

10. A printing apparatus according to claim 9, wherein said control keys disable/enable a spell verify operational function.

11. A printing apparatus according to claim 1, wherein said output means is comprised by relatively movable print carriage and platen controlled by said processing means and wherein the process steps include process steps to control relative movement of said carriage and said platen.

12. A printing apparatus according to claim 1, wherein said output means includes a daisy wheel, a hammer, a carriage motor, and a ribbon motor.

13. A printing apparatus according to claim 1, wherein said output means may be comprised of a bubble jet printer, or an ink jet printer or a thermal transfer printer.

14. A printing apparatus comprising:

a keyboard for manually inputting a character string and for selecting a mode of operation;

a printer for printing the input character string from the keyboard;

an external memory accessed in accordance with a multi-bit address for storing more than one spelling information dictionary; and a microprocessor including a random access memory, a read-only memory, a first dedicated interface port comprised from a first multi-bit connection to the printer and which interfaces to the printer, a second dedicated interface port comprised of a second multi-bit connection and which is connectable to the external memory, a third dedicated interface port comprised of a third multi-bit connection for delivering address information to the external memory and which interfaces to the external memory, and a fourth dedicated interface port comprised of a fourth multi-bit connection and which is connected to an address latch for latching address information from the fourth dedicated interface port to the external memory simultaneously with the delivery of address information from the third dedicated interface port to the external memory and which is also connected to the external memory for receiving spelling information accessed from the external memory, wherein said microprocessor controls the output of the printer in accordance with said input character string from the keyboard and accesses the external memory in accordance with said input character string, wherein said microprocessor writes 1) one bit of address information through the second dedicated interface port to the external memory in order to select one of the spelling information dictionaries in the external memory, 2) a first part of address information through the third dedicated interface port to the external memory, and 3) a second part of address information through the fourth dedicated interface port to the external memory, and wherein the external memory outputs spelling information to the fourth dedicated interface port based on the first and second parts of address information.

15. A printing apparatus according to claim 14, wherein said printer comprises a daisy wheel motor, hammer, carriage motor, and ribbon motor.

16. A printing apparatus according to claim 14, wherein said printer may be comprised of a bubble jet printer, or an ink jet printer or a thermal transfer printer.

17. A printing apparatus according to claim 14, wherein said read only memory includes process steps for controlling said printer to output character strings input by said keys and for accessing the external memory according to said input character string.

18. A printing apparatus according to claim 14, wherein said random access memory stores character string input by the keyboard, and wherein said microprocessor accesses external memory based on the character string in the random access memory.

19. A printing apparatus according to claim 18, wherein said input character string include character information and wherein said microprocessor includes detecting means for detecting end of character string.

20. A printing apparatus according to claim 19, wherein said microprocessor is adapted to access said external memory, and wherein said microprocessor is adapted to access said external memory in response to end of character string detection.

21. A printing apparatus according to claim 20, wherein said microprocessor retrieves spelling information stored based on said access, and further comprising alarm means responsive to retrieved spelling information.

22. A printing apparatus according to claim 21, wherein said microprocessor senses plural operational conditions and sounds the alarm distinctively.

23. A printing apparatus according to claim 14, wherein said detection means detects end of character string in response to said keyboard inputting a space or a punctuation.

24. A printing apparatus according to claim 14, wherein the external memory stores spelling information.

25. A printing apparatus according to claim 14, wherein the keyboard includes control keys for controlling operational modes.

26. A printing apparatus according to claim 25, wherein the control keys disable/enable a spell verify operational mode.

27. A printing apparatus according to claim 14, wherein said printer is comprised by relatively movable print carriage and platen controlled by said microprocessor and wherein the process steps include process steps to control relative movement.

28. Spell verification processor comprising:
a microprocessor having a first dedicated interface port comprised of a first multi-bit connection and which is connectable to a dictionary containing spelling information, said microprocessor having a selectably actuatable spell verification mode in which a character string is checked against spelling information within said dictionary, said microprocessor including means for checking whether said dictionary is connected to the first dedicated interface port of said microprocessor, a second dedicated interface port comprised of a second multi-bit connection for delivering address information to said dictionary, and a third dedicated interface port comprised of a third multi-bit connection and which is connected to an address latching means for latching address information from the third dedicated interface port to the dictionary simultaneously with the delivery of address information from the second dedicated interface port to the dictionary and which is also connected to the storage means for receiving spelling information accessed from the dictionary, wherein said microprocessor is adapted to actuate the spell verification mode in the case said dictionary is connected to the first dedicated interface port and to disable the spell verification mode in the case said dictionary is not connected to the first dedicated interface port, and wherein said microprocessor writes 1) a first part of address information through the second dedicated interface port to the dictionary and 2) a second part of address information through the third dedicated interface port to the dictionary, and wherein the dictionary outputs spelling information to the third dedicated interface port based on the first and second parts of address information.

29. A spell verification processor according to claim 28, wherein said means for checking performs a power-up check to determine if said dictionary is connected to the interface.

30. A spell verification processor according to claim 29, wherein said microprocessor performs the power-up check by actuating the spell verification mode and by sending a predetermined character string to said dictionary.

31. A spell verification processor according to claim 30, wherein said dictionary includes at least two different but complementary sets of spelling information.

32. A spell verification processor according to claim 31, wherein the two dictionaries both include entries for the predetermined character string.

33. A printing apparatus comprising:
storage means including a single read-only memory having plural dictionaries of spelling information;
manual designation means for permitting manual designation of one of the plural dictionaries;
process means for selecting one of the plural dictionaries via a first dedicated interface port comprised of a first multi-bit connection to the storage means, in accordance with the designation by the manual designation means;
a second dedicated interface port comprised of a second multi-bit connection to the storage means for delivering address information to the storage means; and
a third dedicated interface port comprised of a third multi-bit connection and which is connected to an address latching means for latching address information from the third dedicated interface port simultaneously with the delivery of address information from the second dedicated interface port to the storage means and which is also connected to the storage means for receiving spelling information accessed from the storage means, wherein said process means writes 1) one bit of address information through the first dedicated interface port to the storage means in order to select one of the plural dictionaries in the read-only memory, 2) a first part of address information through the second dedicated interface port to the storage means, and 3) a second part of address information through the third dedicated interface port to the storage means, and wherein the storage means outputs spelling information to the third dedicated interface port based on the first and second parts of address information.

34. A printing apparatus according to claim 33, further comprising input means for inputting character information.

35. A printing apparatus according to claim 34, wherein said input means and said designation means are comprised by a keyboard.

36. A printing apparatus according to claim 35, wherein the designation means is plural keystrokes of said keyboard.

37. A printing apparatus according to claim 34, further comprising a random access memory for storing a current designation and said input character information.

38. A printing apparatus according to claim 37, wherein said random access memory stores character information input by the input means, and wherein said process means access the storage means based on the character information stored in the random memory means.

39. A printing apparatus according to claim 38, wherein the character information includes character strings and wherein said process means includes means for detecting end of character strings.

40. A printing apparatus according to claim 39, wherein said process means is adapted to access said storage means in response to end of character string detection.

41. A printing apparatus according to claim 40, wherein said process means retrieves information stored in said storage means based on said access, and further comprising alarm means responsive to retrieved spelling information from said storage means.

42. A printing apparatus according to claim 41, wherein the process means senses plural operational conditions and sounds the alarm distinctively.

43. A printing apparatus according to claim 34, wherein the keyboard includes control keys for controlling operational modes.

44. A printing apparatus according to claim 43, wherein the control keys disable/enable a spell verify operational mode.

45. A printing apparatus according to claim 33, further comprising output means for outputting character information input by said input means under control of said process means, wherein the output means is comprised by relatively movable print carriage and platen controlled by process means and wherein the process steps include process steps to control relative movement.

46. A printing apparatus according to claim 45, wherein said output means includes a daisy wheel, a hammer, a carriage motor, and a ribbon motor.

47. A printing apparatus according to claim 45, wherein said output means may be comprised of a bubble jet printer, or an ink jet printer or a thermal transfer printer.

48. An apparatus according to claim 33, wherein said process means receives designations from the designation means through a dedicated interface port and selects said dictionary through another dedicated interface port connected to the storage means.

49. An apparatus according to claim 33, wherein said storage means stores at least two dictionaries on a single read only memory, one dictionary stored in the upper half and the other in the lower half, and wherein said process means selects the designated dictionary by enabling or disabling a most significant address bit for the read only memory.

50. A spell verification processor comprising:

a microprocessor having internal random access memory and internal read only memory, said microprocessor including a program for selectively actuating a spell verification mode in which character strings are checked against spelling information stored in an external memory, said microprocessor including a program within said internal read only memory for checking whether the external memory is connected to a first dedicated interface comprised of a first multi-bit connection to the microprocessor and for enabling the spell verification mode in the case where the external memory is connected to the first dedicated interface and for disabling the spell verification mode in the case where the external memory is not connected to the first dedicated interface;

a second dedicated interface comprised of a second multi-bit connection for delivering address information to the external memory and which is connected to the external memory; and a third dedicated interface comprised of a third multi-bit connection and which is connected to an address latch for latching address information from the third dedicated interface to the external memory simultaneously with the delivery of address information from the second dedicated interface to the external memory and which is also connected to the external memory for receiving spelling information accessed from the external memory, wherein said microprocessor writes 1) a first part of address information through the second dedicated interface to the external memory and 2) a second part of address information through the third dedicated interface to the external memory, and wherein the external memory outputs spelling information to the third dedicated interface based on the first and second parts of address information.

51. A spell verification processor according to claim 50, wherein said microprocessor performs a power-up check to check said connection between the interface and the external memory.

52. A spell verification processor according to claim 51, wherein said power-up check is performed by said microprocessor by actuating said spell verification mode and by sending to said external memory a predetermined character string known to be in said dictionary.

53. A spell verification processor according to claim 52, wherein the external memory stores at least two dictionaries and wherein each dictionary has the same predetermined character string stored therein.

54. A spell verification processor according to claim 50, further comprising alarm means.

55. A spell verification processor according to claim 54, wherein the microprocessor senses plural operational conditions and sounds the alarm distinctively.

56. A spell verification processor according to claim 50, further comprising input means for inputting character strings.

57. A spell verification processor according to claim 56, wherein the end of a character string is detected in response to input of space and/or punctuation by said input means.

58. A spell verification processor according to claim 56, wherein said input means is comprised by a keyboard.

59. A spell verification processor according to claim 58, wherein the keyboard includes control keys for controlling operational modes.

60. A spell verification processor according to claim 59, wherein the control keys disable/enable said spell verify operational mode.

61. A spell verification processor according to claim 50, further comprising output means for outputting character strings input by said input means.

62. A spell verification processor according to claim 50, wherein the output means is comprised by relatively movable print carriage and platen controlled by said microprocessor and wherein the process steps include process steps to control relative movement.

63. A spell verification processor according to claim 62, wherein the output means includes a daisy wheel, a hammer, a carriage motor, and a ribbon motor.

64. A spell verification processor according to claim 62, wherein said output means may be comprised of a bubble jet printer, or an ink jet printer or a thermal transfer printer.

65. A printing apparatus comprising:

a read only memory for storing plural dictionaries of spelling information;

a selection switch for selecting one of the plural dictionaries;

a single chip microprocessor for selecting one of the plural dictionaries in said read only memory via a first dedicated interface comprised of a first multi-bit connection to the memory, in accordance with the selection switch;

a second dedicated interface comprised of a second multi-bit connection for delivering address information to the read only memory and which interfaces to the read only memory; and a third dedicated interface comprised of a third multi-bit connection and which is connected to an address latch for latching address information from the third dedicated interface to the read only memory simultaneously with the delivery of address information from the second dedicated interface to the read only memory and which is also connected to the read only memory for receiving spelling information accessed from the read only memory, wherein said single chip microprocessor writes 1) one bit of address information to the read only memory in order to select one of the plural dictionaries stored in the read only memory, 2) a first part of address information through the second dedicated interface to the read only memory, and 3) a second part of address information through the third dedicated interface port to the read only memory, and wherein the read only memory outputs spelling information to the third dedicated interface based on the first and second parts of address information.

66. A printing apparatus in accordance with claim 65, further comprising a keyboard for inputting character information.

67. A printing apparatus in accordance with claim 66, wherein the selection switch is comprised by plural keystrokes of the keyboard.

68. A printing apparatus in accordance with claim 65, further comprising a random access memory for storing a selection by the selection switch and for storing input character information.

69. A printing apparatus with spell verification, comprising:

a keyboard for inputting characters and for setting an operational mode;

a read only memory for storing plural dictionaries of spelling information;

a printer for printing characters;

a microprocessor, including internal memory for storing process steps to control the printer and to control a spell verification function of the printing apparatus, said microprocessor further including detection means for detecting means whether the read only memory is connected to a first dedicated interface comprised of a first multi-bit connection, said microprocessor actuating the spell verification function in the case where the read only memory is connected to the first dedicated interface and disabling the spell verification function in the case where the read only memory is not connected to the first dedicated interface, and said microprocessor accessing the read only memory in accordance with the process steps stored in the internal memory on the basis of an input character input from the keyboard through a second dedicated interface comprised of a second multi-bit connection to the microprocessor which interfaces to said microprocessor and causes the printer, by outputting through a third dedicated interface comprised of a third multi-bit connection to the microprocessor and which interfaces to said microprocessor, to print a character in accordance with the input character;

a fourth dedicated interface comprised of a fourth multi-bit connection for delivering address information to the read only memory and which is connected to the read only memory; and a fifth dedicated interface comprised of a fifth multi-bit connection and which is connected to an address latch for latching address information from the fifth dedicated interface to the read only memory simultaneously with the delivery of address information from the fourth dedicated interface to the read only memory and which is also connected to the read only memory for receiving spelling information accessed from the read only memory, wherein said microprocessor writes 1) one bit of address information through the first dedicated interface to the read only memory in order to select one of the plural dictionaries stored in the read only memory, 2) a first part of address information through the fourth dedicated interface to the read only memory, and 3) a second part of address information through the fifth dedicated interface to the read only memory, and wherein the read only memory outputs spelling information to the fifth dedicated interface based on the first and second parts of address information.

70. A printing apparatus according to claim 69, wherein said microprocessor selects one of the plural dictionaries stored in the read only memory in accordance with an operational mode set by said keyboard.

71. A printing method comprising the steps of:

providing at least one spelling information dictionary;

inputting print information; and executing process steps that are stored in internal program memory of a single chip microprocessor so as to output print information input in said inputting step and so as to access stored spelling information from the dictionary in accordance with input print information, wherein said single chip processor controls output of print information by sending commands using a first dedicated interface comprised of a first multi-bit connection which is connected to output means and accesses spelling information using a second dedicated interface comprised of a second multi-bit connection for delivering address information to a dictionary and a third dedicated interface comprised of a third multi-bit connection which is connected to an address latch for latching address information from the third dedicated interface to the dictionary simultaneously with the delivery of address information from the second dedicated interface to the dictionary and which is also connected to the dictionary for receiving spelling information accessed from the dictionary, wherein said microprocessor writes, in order to access spelling information in the dictionary, 1) a first part of address information through the second dedicated interface to the dictionary and 2) a second part of address information through the third dedicated interface to the dictionary, and wherein the dictionary outputs spelling information to the third dedicated interface based on the first and second parts of address information.

72. A method according to claim 71, further comprising the step of storing print information input in said inputting step in the single chip microprocessor and wherein said dictionary access step is performed in accordance with the print information stored in said storing step.

73. A method according to claim 72, further comprising the step of detecting end of character string.

74. A method according to claim 73, wherein said dictionary accessing step is performed in response to end of character string detection.

75. A method according to claim 74, further comprising the step of retrieving spelling information based on the dictionary access step and the step of actuating an alarm responsive to retrieved spelling information.

76. A method according to claim 75, further comprising the step of sensing plural operational conditions and wherein the alarm is actuated distinctively for different operational conditions.

77. A method according to claim 74, wherein said detecting step detects end of character string in response to input of a space or a punctuation.

78. A method according to claim 71, wherein in said providing step plural dictionaries are provided and further comprising the step of selecting one of the plural dictionaries.

79. A method according to claim 71, wherein said inputting step is comprised by keyboard entry.

80. A method according to claim 79, wherein said inputting step includes controlling operational modes from said keyboard entry.

81. A method according to claim 80, wherein said controlling operational modes includes controlling a spell verify operational mode.

82. A method according to claim 71, wherein said outputting step is comprised by relatively moving a print carriage and a platen and wherein the process steps include process steps to control relative movement of said carriage and said platen.

83. A printing method comprising the steps of:

providing an external memory with plural spelling information dictionaries, said external memory being accessible in accordance with a multi-bit address;

inputting a character string and selecting an operational mode by keyboard entry through a first dedicated interface port comprised of a first multi-bit connection and which is connected to a microprocessor;

printing a character string input by said inputting step in accordance with a command sent from said microprocessor through a second dedicated interface port comprised of a second multi-bit connection and which is connected to a printer; and accessing spelling information in the external memory through a third dedicated interface port comprised of a third multi-bit connection and which is connected between a processor and the external memory, a fourth dedicated interface port comprised of a fourth multi-bit connection between the processor and the external memory for outputting address information to the external memory, and a fifth dedicated interface comprised of a fifth multi-bit connection which is connected between the processor and an address latch for latching address information from the fifth dedicated interface to the external memory simultaneously with the delivery of address information from the fourth dedicated interface to the external memory, said fifth multi-bit connection also being connected to the external memory for receiving spelling information accessed from the external memory, wherein said microprocessor writes 1) one bit of address information through the third dedicated interface to said external memory in order to select one of said plural spelling information dictionaries, 2) a first part of address information through the fourth dedicated interface to the external memory, and 3) a second part of address information through the fifth dedicated interface to the external memory, and wherein the external memory outputs spelling information to the fifth dedicated interface based on the first and second parts of address information.

84. A method according to claim 83, further comprising the step of detecting an end of character string.

85. A method according to claim 84, and wherein spelling information is accessed in response to end of character string detection.

86. A method according to claim 85, further comprising the step of retrieving spelling information stored in said external memory in accordance with said accessing step, and the step of actuating an alarm in response to retrieved spelling information.

87. A method according to claim 86, further comprising the step of sensing plural operational conditions and actuating an alarm distinctively.

88. A method according to claim 85, wherein said detecting step detects an end of character string in response to inputting a space or a punctuation.

89. A method according to claim 82, wherein in said providing step plural dictionaries are provided and further comprising the step of selecting one of the plural dictionaries.

90. A method according to claim 89, further comprising the step of storing character strings in a random access memory and the step of storing the selection from said selecting step in the same random access memory.

91. A method according to claim 83, wherein said inputting step includes controlling operational modes by keyboard entry.

92. A method according to claim 91, wherein said inputting step inputs operational modes including disabling/enabling a spell verify operational mode.

93. A method according to claim 83, wherein said printing step is comprised by relatively moving a print carriage and a platen controlled by said microprocessor and wherein said controlling step includes process steps to control relative movement of said print carriage and said platen.

94. A spell verification method, comprising the steps of:

checking whether a dictionary of spelling information is connected to a first dedicated interface port comprised of a multi-bit connection and which interfaces to a microprocessor;

selectably actuating a spell verification mode in which an input character string is compared with the spelling information in accordance with said checking step, wherein the spell verification mode is enabled in the case where said dictionary is connected to the first dedicated interface port and wherein the spell verification mode is disabled in the case where said dictionary is not connected to the first dedicated interface port; and accessing spelling information in the dictionary through a second dedicated interface port, comprised of a second multi-bit connection to the dictionary for delivering address information to the dictionary, and a third dedicated interface port comprised of a third multi-bit connection and which is connected to an address latch for latching address information from the third dedicated interface port to the dictionary simultaneously with the delivery of address information from the second dedicated interface port to the dictionary and which is also connected to the dictionary for receiving spelling information accessed from the dictionary, wherein said microprocessor writes 1) a first part of address information through the second dedicated interface port to the dictionary and 2) a second part of address information through the third dedicated interface port to the dictionary, and wherein the dictionary outputs spelling information to the third dedicated interface port based on the first and second parts of address information.

95. A method according to claim 94, further comprising the step of detecting whether said dictionary is connected to a dedicated interface port of a microprocessor during a power-up check.

96. A method according to claim 95, wherein said detecting step includes performing the power-up check by actuating the spell verification mode and by sending a predetermined character string to said dictionary to determine if the dictionary is present.

97. A method according to claim 96, further comprising the step of providing at least two dictionaries of different but complementary entries of spelling information.

98. A method according to claim 97, wherein the at least two dictionaries have the same predetermined spelling information stored therein.

99. A method for spell verification in an electronic typewriter, comprising the steps of:

providing an internal read only memory of a microprocessor with program steps for selectively actuating a spell verification mode;

inputting character strings from a keyboard;

detecting whether an external memory having at least two dictionaries of spelling information stored therein is connected to a first dedicated interface comprised of a multi-bit connection;

selectively actuating a spell verification mode for checking character strings input in said inputting step against spelling information stored in a dictionary in said external memory;

enabling said spell verification mode in the case where said external memory is connected to the dedicated interface and disabling said spell verification mode in the case where the external memory is not connected to the first dedicated interface; and accessing spelling information in the external memory through a second dedicated interface, comprised of a second multi-bit connection to the external memory for delivering address information to the external memory, and a third dedicated interface comprised of a third multi-bit connection and which is connected to an address latch for latching address information from the third dedicated interface to the external memory simultaneously with the delivery of address information from the second dedicated interface to the external memory and which is also connected to the external memory for receiving spelling information accessed from the external memory, wherein said microprocessor writes 1) one bit of address information through said first dedicated interface to said external memory in order to select one of the at least two dictionaries of spelling information, 2) a first part of address information through said second dedicated interface to the external memory, and 3) a second part of address information through said third dedicated interface to said external memory, and wherein the external memory outputs spelling information to the third dedicated interface based on the first and second parts of address information.

100. A method according to claim 99, further comprising a designating step for designating one of the dictionaries in said external memory.

101. A method according to claim 100, wherein said designating step includes designating by said keyboard.

102. A method according to claim 101, wherein said designating step is performed by plural keystrokes of said keyboard.

103. A method according to claim 99, further comprising a step of storing a current designation and input character strings in a random access memory of said microprocessor.

104. A method according to claim 99, wherein said storing step includes storing character strings input in said input step, and wherein in accordance with said designating step said external memory is accessed based on the character strings stored.

105. A method according to claim 99, further comprising the step of detecting end of character string input in said inputting step.

106. A method according to claim 105, further comprising the step of accessing said external memory in response to end of character string detection.

107. A method according to claim 106, wherein said accessing step includes retrieving information stored in said external memory based on said input character string, and further comprising actuating an alarm in response to retrieved information.

108. A method according to claim 107, wherein said actuating step includes actuating said alarm distinctively in response to respective plural operational conditions.

109. A method according to claim 99, wherein said inputting step includes inputting operational modes by said keyboard.

110. A method according to claim 109, wherein said inputting operational modes includes disabling/enabling a spell verify operational mode.

111. A method according to claim 99, further comprising the step of outputting the character strings input in said input step.

112. A method according to claim 111, wherein said outputting step includes relatively moving a print carriage and a platen controlled by said microprocessor and wherein the program steps include process steps to control relative movement.

113. A method according to claim 112, wherein said outputting step includes outputting to a daisy wheel, a hammer, a carriage motor, and a ribbon motor.

114. A spell verification method, comprising the steps of: selectively enabling a spell verification mode in which program steps stored in an internal read only memory of a microprocessor are processed so as to check input character strings against spelling information stored in one of plural dictionaries of an external memory;

detecting whether said external memory is connected to a first dedicated interface comprised of a first multi-bit connection;

enabling the spell verification mode in the case where the external memory is connected to the first dedicated interface or disabling the spell verification mode in the case where the external memory is not connected to the first dedicated interface; and accessing spelling information in the external memory through a second dedicated interface, comprised of a second multi-bit connection to the external memory for delivering address information to the external memory, and a third dedicated interface comprised of a third multi-bit connection and which is connected to an address latch for latching address information from the third dedicated interface to the external memory simultaneously with the delivery of address information from the second dedicated interface to the external memory and which is also connected to the external memory for receiving spelling information accessed from the external memory, wherein said microprocessor writes 1) one bit of address information through said first dedicated interface to the external memory in order to select one of the plural dictionaries, 2) a first part of address information through said second dedicated interface to the external memory, and 3) a second part of address information through said third dedicated interface to the external memory, and wherein the external memory outputs spelling information to the third dedicated interface based on the first and second parts of address information.

115. A method according to claim 114, wherein said detecting step performs a power-up check to determine whether said interface is connected to said external memory.

116. A method according to claim 115, wherein said detecting step includes power-up check performed by enabling said spell verification mode and by sending to said external memory a predetermined character string known to be in said dictionary.

117. A method according to claim 116, wherein each dictionary has the same predetermined character string stored therein.

118. A method according to claim 114, further comprising the step of sensing plural operational conditions and the step of actuating an alarm distinctively for the operational conditions and the spelling verification mode.

119. A method according to claim 114, further comprising an inputting step for inputting character strings.

120. A method according to claim 119, wherein said inputting step is comprised by keyboard entry.

121. A method according to claim 120, wherein said inputting step includes inputting operational modes.

122. A method according to claim 121, wherein said detecting step further includes detecting end of character string in response to inputting a space and/or punctuation.

123. A method according to claim 122, wherein said inputting operational modes includes disabling/enabling said spell verify operational mode.

124. A method according to claim 114, further comprising an outputting step for outputting character strings on the basis of character strings input in said inputting step.

125. A method according to claim 124, wherein said outputting step includes relatively moving a print carriage and a platen controlled by said microprocessor and wherein said microprocessor includes process steps to control relative movement.

126. A method according to claim 124, wherein said outputting step includes outputting to a daisy wheel, a hammer, a carriage motor, and a ribbon motor.

127. A method for spell verification in a printing apparatus, comprising the steps of:

storing plural dictionaries of spelling information;

selecting one of the plural dictionaries;

controlling selection of the dictionary in said selecting step by process steps in an internal read only memory of a single chip microprocessor; and accessing spelling information in the selected dictionary through a first dedicated interface port comprised of a first multi-bit connection to the dictionary, a second dedicated interface port comprised of a second multi-bit connection to the dictionary for delivering address information to the dictionary, and a third dedicated interface port comprised of a third multi-bit connection and which is connected to an address latch for latching address information from the third dedicated interface port to the dictionary simultaneously with the delivery of address information from the second dedicated interface port to the dictionary and which is also connected to the dictionary for receiving spelling information accessed from the dictionary, wherein said microprocessor writes 1) one bit of address information through the first dedicated interface port to the plural dictionaries in order to select one of the plural dictionaries, 2) a first part of address information through the second dedicated interface port to the selected dictionary, and 3) a second part of address information through the third dedicated interface port to the selected dictionary, and wherein the selected dictionary outputs spelling information to the third dedicated interface port based on the first and second parts of address information.

128. A method in accordance with claim 127, further comprising an inputting step for inputting character information by a keyboard.

129. A method in accordance with claim 128, wherein said selecting step includes selecting by a selection switch comprised by plural keystrokes of the keyboard.

130. A method in accordance with claim 127, further comprising a storing step for storing a selection by the selecting step.

131. A method of spell verification in a printing apparatus, comprising the steps of:

inputting characters and operational modes by keystrokes;

printing characters input in said inputting step;

executing program steps stored in an internal read only memory of a microprocessor, said program steps including steps for controlling said printing step and steps for selectively actuating a spell verification mode in which input characters are verified against spelling information in one of plural dictionaries stored in an external read only memory connectable to the microprocessor;

detecting whether said external read only memory is connected to a first dedicated interface comprised of a first multi-bit connection; and accessing spelling information through a second dedicated interface, comprised of a second multi-bit connection to the external read only memory for delivering address information to the external read only memory, and a third dedicated interface comprised of a third multi-bit connection and which is connected to an address latch for latching address information from the third dedicated interface to the external read only memory simultaneously with the delivery of address information from the second dedicated interface to the external read only memory and which is also connected to the external read only memory for receiving spelling information accessed from the external read only memory, wherein said microprocessor writes 1) one bit of address information through the first dedicated interface to the external read only, memory in order to select one of the plural dictionaries, 2) a first part of address information through the second dedicated interface to the external read only memory, and 3) a second part of address information through the third dedicated interface port to the external read only memory, wherein the external read only memory outputs spelling information to the third dedicated interface based on the first and second parts of address information, wherein in said executing step the program steps enable said spell verification mode in the case where said read only memory is connected to the first dedicated interface and the program steps disable said spell verification mode in the case where said read only memory is not connected to the first dedicated interface, and wherein said microprocessor accesses the external read only memory in accordance with the process steps stored in the internal memory on the basis of an input character input by keystrokes through a fourth dedicated interface which interfaces only to the microprocessor and causes printing in said printing step by outputting through a fifth dedicated interface which interfaces only to the microprocessor so as to print a character in accordance with the input character.

\* \* \* \* \*